Patented Feb. 27, 1951

2,543,467

UNITED STATES PATENT OFFICE 2,543,467

METHOD FOR PRODUCING HIGH-PURITY SOYBEAN PROTEIN

Herbert Otto Renner, Des Plaines, Ill., assignor, by mesne assignments, to J. R. Short Milling Company, Chicago, Ill., a corporation of Illinois No Drawing. Application June 16, 1947, Serial No. 755,021

15 Claims. (Cl. 260—123.5)

This invention pertains to new methods of preparing high purity proteins. More particularly it relates to the preparation of such proteins from particulate soybean material (e. g., flour, meal or flakes) treated with organic solvents to remove substances of non-proteinous nature, which cause great difficulties in the clarification of protein extracts with resulting proteins of unsatisfactory quality, as disclosed in my copending application Serial No. 730,539, filed February 24, 1947, now Patent No. 2,524,991, (Case A). The processes constituting this invention use soybean products produced by the invention described in my copending application cited, and hence this application is a continuation in part of that application.

The relation of the invention disclosed in this application to that disclosed in my copending application Serial No. 730,539, filed February 24, 1947, is clearly shown in a general way in Table I which appears in that copending application and is repeated here for convenience in indicating the close relationship of the subject inventions.

the former application, the refined product desired is item (1) of column 3, Table I, whereas in this application, the refined product desired is item (2) of column 3, Table I.

In the prior art a vast amount of time and expense have been devoted to efforts to produce soy-proteins free from contaminating impurities (largely non-proteinous in nature), which adversely affect the desirable organoleptic and keeping properties of such proteins and reduce their suitability as components of plastics and other products where high purity is a key to quality.

The difficulties and importance of producing soy-proteins of the highest purity obtainable have been very clearly portrayed by workers in this field, as for example, by A. A. Horvath in "The Soybean Industry," 1938, pages 147–150. Also, the surprisingly diverse factors for protein calculations from nitrogen content employed by previous investigators indicate an unmistakable lack of knowledge in the prior art concerning the true nature and purity of the substances covered by the collective term "soybean proteins." Thus,

TABLE I

| Raw materials used and originating in soybeans | Methods of using "Cellosolves" | Refined products aimed at— | By-products of unknown, partly known or potential value |
|---|---|---|---|
| 1 | 2 | 3 | 4 |
| Ia: Soybean-flakes or flour from whole (i. e., nonsolvent - extracted) enzyme-active soybeans. | (1a) Continuous or (1b) batch - extraction using varying ratios of solids/solvent. | (1) Odor - flavorless soy-flakes/meal with improved properties for human food. | (1) "Cellosolve"-soluble water-insoluble fractions of raw-material. |
| Ib: Soybean-flakes or flour of Ia solvent-extracted by known methods enzyme active or not. | (2) Wetting | (2) Improved soy-flakes/meal for preparation of protein of higher purity. | (2) "Cellosolve"-soluble water - soluble fractions of raw material |
|  | (1a) Continuous or (1b) batch-extraction | (3) Soybean meal of selective enzyme-activity | (3) "Cellosolve" - insoluble fractions of soy oil |
|  | (2) Wetting |  |  |

Column 1 of Table I shows the raw materials used in the processes disclosed in my copending application cited and in this application, while columns 2 and 3 represent principal flow sheets of the several methods of processing these raw materials in accordance with these inventions. The arrows indicate at a glance the progress of each individual method (column 2), with regard to the refined products arrived at (column 3), and the nature of the by-products obtained (column 4). The principal difference between the processing of the raw material in my copending application cited and in this case resides in the ultimate refined product. Thus, in D. B. Jones in 1931 uses a factor of 5.7 (based on 17.5% nitrogen content of pure glycinine); K. S. Markley and W. H. Goss (Soybean Chemistry and Technology, 1944, page 19) use a factor of 6.02 (based on 16.6% nitrogen content of soy-protein); W. G. Smiley and A. K. Smith (Cer. Chem., 1946, page 290) mention as "conventional factor for determining the protein content of soybean products" a value of 6.25 (based on 16.0% $N_2$-content of soy-protein); while Horvath (cited above, page 144) advocates for use in alkali-treated soybean protein a factor of 6.33 (based on $N_2$-content of 15.8%).

Accordingly, an object of the present invention is to produce a substantially purer soy-protein than has heretofore been produced by methods of the prior art.

Another object of this invention is the production of soy-protein of increased purity and yield by the use as starting material of "Cellosolve"-refined soy-meal produced according to the methods disclosed in my copending application, Serial No. 730,539, filed February 24, 1947.

Another object of this invention is the production of purer soybean protein without employing acid-washing prior to alkali-extraction.

Still another object of this invention is to produce higher purity soy-proteins by two step protein precipitation of soy-proteins from alkali extracts of "Cellosolve"-extracted soy material characterized by the removal of the precipitate from the "whey" of the first step before raising the pH value of the first step to the pH value required for the second step precipitation.

With these and other objects in view which may be incident to my improvements, my invention consists in the combination and arrangement of elements and steps hereinafter described and illustrated by typical examples.

One of the advantages of using "Cellosolve"-extracted soy material as a starting substance for the production of high purity soy-proteins is the fact that the removal of "Cellosolve"-soluble fractions from soybean meal results in a very noticeable increase in nitrogen-content of the residue, as shown in Table II.

To clearly distinguish from the prior art and for general clarity and brevity, certain special terms and abbreviations will be used in this application, with the following definitions:

The term "soybean flakes" includes any type of soybean particulate material obtained by breaking down whole soybeans into flakes, meals and flours of any desired particle size which for practical reasons are preferably freed from most of their oil by expressing or other well-known solvent-extraction methods (such as extraction with hexane). Meal or flakes from whole soybeans, and hydrocarbon(hexane)-extracted soy-meal or flakes (so-called "White Flakes" of commerce), are both suitable raw materials and yield products of the same basic properties when submitted to low temperature-extraction with methyl or ethyl "Cellosolve." However, the use of "White Flakes" as raw material is preferred as it offers important technical advantages over the use of whole soybean flakes, as will hereinafter appear.

The term "Cellosolve-refined soybean meal" (abbreviated "CRS") is used to denote a soymeal or soy-protein meal prepared by the methods disclosed in my copending application, Serial No. 730,539, filed February 24, 1947, and possessing all of the properties cited as objects of that invention.

Methyl "Cellosolve" is abbreviated: "m-Cel."

The word "Cellosolve," appearing at the top of column 2, Table I and elsewhere in this specifi-

TABLE II

*Comparative nitrogen and protein contents of soy material extracted by prior art commercial extraction and "Cellosolve" extraction*

| No. | Sample of soy material | Nitrogen on dry basis | Protein—Equivalent on dry basis $N_2 \times 6.02$ [1] | Ash Content on dry Basis |
|---|---|---|---|---|
| | | Per cent | Per cent | Per cent |
| 1 | Commercially extracted "White Flakes." | 8.54 | 51.41 | 6.06 |
| 2 | Ethyl alcohol extracted Soy-flakes. | 9.50 | 57.19 | 6.30 |
| Average 1 and 2 | | 9.02 | 54.30 | 6.18 |
| 3 | Methyl-"Cellosolve" extracted "White Flakes" (containing hulls). | 9.80 | 59.00 | 6.46 |
| 4 | Methyl-"Cellosolve" extracted "White Flakes" (hulls removed by sifting from No. 3). | 10.27 | 63.67 | 6.70 |
| Average 3 and 4 | | 10.04 | 61.39 | 6.58 |

[1] Based on 16.6% nitrogen-content of soy-protein, used by I. S. Markley and W. H. Goss (Soybean Chemistry and Technology, 1944, page 19), which is closest to the average of factors for protein calculations, as indicated on page 2.

In addition to the foregoing advantage, a study of the properties of the "Cellosolve"-soluble fractions, in particular: their hygroscopicity, water-solubility, low non-proteinous nitrogen, and non-ionized phosphoric acid content, and their tendency to form dark colored substances during storage in air under normal conditions of humidity and temperature, suggested very strongly the probability that if "Cellosolve"-refined soy material is used as a starting substance for the extraction of commercial soybean-proteins, it would prove superior to commercial solvent-extracted soy material (such as "White Flakes") heretofore used for this purpose. This indication was fully borne out by the results of my researches and experiments which form the basis of the present invention.

cation, is used for brevity to denote generically the group of alkoxy ethanols, comprising methyl "Cellosolve" (2-methoxy ethanol or glycol monomethyl ether), and ethyl "Cellosolve" (2-ethoxy ethanol or glycol monoethyl ether), in lieu of the longer and more explicit chemical identification. While most of the results disclosed in this application were obtained by employing methyl "Cellosolve," it was found that substantially the same results were obtained by the use of ethyl "Cellosolve," but the former is preferred on account of its lower boiling point, particularly where low temperature, vacuum distillation or evaporation were the only means permissible for the removal of all traces of solvent from the product. For the same reason (high boiling points) butyl and benzyl "Cellosolve," while ordinarily included in the general term "Cellosolve," were not used as solvents in the processes herein disclosed and, although they might theoretically be so employed, their commercial usefulness for this purpose appears negligible.

It has been claimed in the literature of the prior art that washing of solvent (hexane)-extracted soybean flakes with acidified water, prior to extraction with alkali, is effective in retarding the dissolution of the globulins and removing those soybean fractions which are considered the cause of great difficulties in the clarification of protein extracts and of unsatisfactory quality of soy-proteins precipitated therefrom. However, no exact information as to the strength of these acidified waters, nor details of methods commercially employed in soy-protein production, are revealed in the literature. Indeed, all this data seems to be a jealously guarded trade secret of individual experimenters and manufacturers. There appears to be no single case on record wherein the methods and sequence of manipulations employed by two workers in this field are identically the same, or differ only in a single variable that would permit the determination of that variable's influence upon the results obtained.

As the washing of commercial solvent-extracted soybean flakes with acidified water, prior to extraction with alkali, adds materially to the time and cost of producing soy-proteins, it would be very advantageous to the whole process if this step could be omitted.

In the absence of data from the prior art concerning the exact acid concentration, the ratio of soy-flakes to washing water, and the extraction period, it was necessary, in order to demonstrate the superiority of "Cellosolve"-extracted soy-flakes over commercial solvent (hexane)-extracted soy-flakes, washed with acidified water, prior to extraction with alkali, to directly compare the results obtained from "Cellosolve"-extraction of White Flakes with those obtained from washing White Flakes with acidified water of varying acid (pH) concentrations. Comparative tests were, therefore, run employing for washing of White Flakes a rather high extraction ratio of 1 part of flakes to 8–10 parts of acidified water, and three concentrations of acid (acetic), namely: (a) water with a pH of 4.5; (b) water with a pH of 3.8; and (c) water containing 0.55% acetic acid and producing wash water (extract) showing a pH of 4.5. The essential steps and very significant results of the three comparative, parallel tests are given in Tables III and IV.

TABLE III

Quantities and properties of extractions removed from white flakes by washing with acidific water of varying pH, as compared with "Cellosolve"-extraction.

| Table No. | | | pH of Wash-Water (with $CH_3COOH$) | | | m-Cel Extraction of White Flakes |
|---|---|---|---|---|---|---|
| | | | pH 4.5 | pH 3.8 (0.2 cc. acid/100 cc. sol.) | pH ? (0.55 cc. acid/100 cc. sol.) | |
| | | | A | B | C | D |
| 1 | Analysis of White Flakes used | Moisture | 6.3% | As A | As A | 6.4%. |
| 1A | | Ash (dry basis) | 6.19% | do | do | 5.94%. |
| 1B | | Nitrogen (dry basis) | 8.67% | do | do | 8.41%. |
| 2A | Amount of Flakes used | Air-dry | 100.0 g | do | do | 100.0 g. |
| 2B | | Moisture-free | 93.7 g | do | do | 93.6 g. |
| 2C | Nitrogen, absolute, in #2 | | 8.12 g | do | do | 7.87 g. |
| 3 | Acidified Water used | | 1000 cc | 800 cc | 1000 cc | 558 cc. of m-Cel. |
| 4 | Behavior of Flakes during washing on suction filter | | Very considerable swelling, filtration extremely difficult. | Swelling same as A filtration sl.[1] less difficult than in A. | Considerable swelling, filtration noticeably easier. | No swelling, speedy filtration possible. |
| 4A | Total Washing Time (intentionally prolonged by filtration) | | 300 min | 165 min | 130 min | Controllable at will. |
| 5 | Wash-Water (Filtrate) collected | Amount | 691 cc | 535 cc | 725 cc | m-Cel-extract brilliant clear. |
| 5A | | pH | 6.4 | 5.0 | 4.5 | |
| 5B | | Appearance | Very turbid | Very turbid | Turbid | |
| 6 | Solid extractives recovered from #5 (in vacuo). | Amount: As is containing $H_2O$. | 69 g. of A-S 5.9% | 45 g. B-S 7.2% | 55 g. C-S 7.4% | 13.4 g. D-S 4.1%. |
| 6A | | Amount, on dry basis | 64.9 g. A-S | 41.7 g. B-S | 50.9 g. C-S | 12.8 g. D-S. |
| 6B | | Nitrogen content: | | | | |
| 6C | | (B) On dry basis | 8.92% | 3.56% | 2.87% | 0.65%. |
| | | (C) Absolutely | 5.78 g | 1.48 g | 1.46 g | 0.083 g. |
| 6D | | (D) In % of total $N_2$ of #2 c. | 71.2% | 18.2% | 18.0% | 1.1%. |
| 6E | Properties of Solid Extractives #6. | Solubil. in M-Cel | Not visibly sol | Not visibly sol | Not visibly sol | Easily completely sol. |
| | | Solution in Water pH | 5.4 | 5.4-5.6 | 5.6 | 5.5. |
| | | | Milky-white, precipitated at pH 4.5. | Very turbid, offensive odor. | Very turbid | Opalescent—Clear. |
| | | Taste | Unpleasant, not sweetish. | Highly unpleasant. | Unpleasant | More or less sweetish, unpleasant. |
| | | Appearance (dry) | Brownish yellow very brittle, hygroscopic. | Lighter yellow, more hygroscopic than A-S. | As B-S | Yellow-brownish, very brittle, very hygroscopic. |
| 7 | Soy Flakes residue remaining. | Amount, on dry basis | 28.8 g. A-R | 52.0 g. B-R | 42.8 g. C-R | 80.8 g. D-R. |
| 7A | | Nitrogen content: | | | | |
| 7A | | (A) On dry basis | 8.12% | 10.1% | 15.5% | 9.63%. |
| 7B | | (B) Absolutely | 2.34 g | 6.64 g | 6.66 g | 7.79 g. |
| 7C | | (C) In % of total $N_2$ of #2C | 28.8% | 81.7% | 82.0% | 98.9%. |
| 8 | Amount of Soy Flakes Residues #7 containing same $N_2$-Am't (9.63%, #7A) as 100 g. of M-Cel-extracted Flakes D-R, on dry basis. | | 118.5 g. A-R | 75.4 g. B-R | 61.9 g. C-R | 100.0 g. D-R or M-Cel-extracted White Flakes. |
| 8A | Equivalent amounts of Air-dry (#2a)-White Flakes yielding the equivalent soy flakes residues of #8. | | 411.4 g | 183.4 g | 144.3 g | 123.7 g. |

[1] Slightly.

Key to abbreviation:
g.=grams. cc.=cubic centimeter. min.=minutes. s=solid extractive. pH=Log (base 10) of the reciprocal of the hydrogen ion concentration in gram molecules per liter. r=residue.

TABLE IV

[Precipitability of solid extractives A-S, B-S and C-S (Table III, Item #6) in comparison with that of M-Cel-soluble soy fraction D-S.]

| Table No. | | Solid extractives (Table III, #6) | | | |
|---|---|---|---|---|---|
| | | A-S | B-S | C-S | D-S |
| | | A | B | C | D |
| 1 | Solid extractives removed from 100 g, air-dry "White Flakes" on dry basis (Table III, #6A). | 64.9 g | 41.7 g | 50.9 g | 12.8 g. |
| 1A | Total nitrogen-contained in #1, on dry basis (Table III, #6c). | 5.78 g | 1.48 g | 1.46 g | 0.083 g. |
| 2 | Properties of solutions of extractives #1 in 15 parts of n/20 NaOH. | Turbid, dirty olive green color. | Turbid, pure yellow color; on standing white precipitate. | Same as B | Very turbid, brownish-yellow; odor very much different from that of B and C. |
| 2A | Fraction insoluble in n/20 NaOH | None | 4.26 g | 2.75 g | None. |
| | Nitrogen content of #2A: | | | | |
| | In per cent | | 1.23% $N_2$ | 2.2% $N_2$ | |
| | Absolute | | 0.052 g | 0.060 g | |
| | In per cent of total $N_2$, #2C of Table III | | 0.64% | 0.73% | *Sol. in 40% HCOH D-$P_1$: 2.68 g. |
| 3 | First precipitation with $SO_2$ at 110° F. at pH 4.5: solids centrifuged (1 washing): yield of 1st precipitate (dried at 63° C). | A-$P_1$: 43.47 g | B-$P_1$: 4.05 g | C-$P_1$: 4.40 g | |
| 3A | First in per cent of solid extractives #1 | 66.9% | 9.7% | 8.6% | 20.9%. |
| 3B | First in per cent of dry flakes (#2B, Table III) | 46.3% | 4.3% | 4.7% | 2.8%. |
| 4 | Nitrogen content of #3, on dry basis | 12.12% | 11.70% | 12.32% | 0.40%. |
| 4A | Nitrogen content of #3, absolutely | 5.27 g | 0.47 g | 0.54 g | 0.0107 g. |
| 4B | Nitrogen content in per cent of total $N_2$ in #1A | 91.1% | 31.9% | 36.9% | 12.8%. |
| 5 | Second treatment of whey of #3 with excess of $SO_2$ caused. | No addit. precipitate. | No addit. precipitate. | No addit. precipitate. | Additional yellow precipitate D-$P_2$. |
| 5A | Yield of 2nd precipitation; absolute | | | | 3.75 g D-$P_2$. |
| 5B | Yield of #5A in per cent of #1 | | | | 29.3%. |
| 5C | Yield of #5A in per cent of dry flakes #2B, (#2B of Table III). | | | | 4.0%. |
| 6 | Nitrogen content of #5A, on dry basis | | | | 0.84%. |
| 6A | Nitrogen content of #5A (A) absolutely | | | | 0.0315 g. |
| 6B | Nitrogen content of #5A (B) in per cent of $N_2$ of #1A. | | | | 37.9%. |
| 7 | Total precipitates (#3+ #5A) | 43.47 g | 4.05 g | 4.40 g | 6.43 g. |
| 7A | #7 in per cent of total extractives #1 | 66.9% | 9.7% | 8.6% | 50.2%. |
| 8 | Total nitrogen precipitated: #4A+6A | 5.27 g | 0.47 g | 0.54 g | 0.042 g. |
| 8A | #8 in per cent of total $N_2$ of #1A | 91.1% | 31.9% | 36.9% | 50.7%. |
| 8B | #8 in per cent of $N_2$ (#2C, Table III) started out with— | 64.9% | 5.7% | 6.6% | 0.053%. |

Key to abbreviation: Same as Table III. P=precipitate.

In Table III above, columns A to C refer to the before mentioned three acidified washing waters used while column D, for comparative purposes, shows the results of washing (extracting) the same white flakes used as starting material in A to C with m-Cel-solvent. As Table III discloses all the essential data as to washing procedure and observations made during this process, no detailed description is deemed necessary. The most significant data under #6, and in particular under 6a–b and 6d, prove beyond any doubt the following facts:

1. Washing of white flakes, even with excessive amounts of highly acidified wash water (columns C and B), fails to remove from solid flakes those extractives removed by m-Cel-extraction (column D) and characterized—in contrast to extractives obtained in A to C—by complete solubility in m-Cel (see #6e: "Solubility in m-Cel"). It must, therefore, be concluded that the use of only small amounts of acidified wash water necessarily will also fail to do so, particularly in view of the fact that due to the extreme swelling and water-imbibing power of white flakes (see #4) the amounts of wash water held per 100 g. of white flakes (Table III: (#3–#5) in A to C) amounted to 309 cc., 265 cc. and 275 cc., respectively, and that ratios of flakes to wash water higher than 1/3.0, 1/2.6, and 1/2.7, respectively would have to be employed in order to saturate the flakes with liquid before any extract would be obtainable.

2. Acid-washing of white flakes, according to columns A to C, as shown by items #6b to 6d, removes apparently considerable amounts of proteinous nitrogen which would result in extremely uneconomical losses in contrast to the apparently exclusive removal of non-proteinous nitrogen, proved to be such by the solubility in 40% formaldehyde of m-Cel-soluble soybean extractives (D-S #6, column D) by m-Cel-extraction. A comparison of figures in item #6a, columns A to C, with column D shows very strikingly the prohibitive losses in substance, by weight of dry flakes (items #2b and #7), one would encounter in practicing any of the methods indicated in columns A to C.

3. From paragraphs 1 and 2 above, it follows conclusively that washing of white flakes with acidified water according to methods A to C (which cover any method possibly used in practice) does not permit the separation of non-proteinous soybean constituents soluble in m-Cel from soy proteins insoluble in m-Cel.

The data of Table IV serve to further fortify the foregoing conclusions by demonstrating that m-Cel-soluble, non-proteinous, soybean fractions (Table IV, column D and D-S of Table III, #6, column D) contain considerable quantities Table IV, #8a) of substances precipitable by acid ($SO_2$) under conditions under which commercial soybean protein is precipitated. Thus, soybean protein prepared by prior art methods from white flakes not acid washed before alkali-extraction, of necessity, is more or less contaminated with non-proteinous impurities forming part of the soybean fractions removed from soyflakes by m-Cel-extraction.

The results shown in Table IV are important in several respects as follows:

1. The figures under #4, as to nitrogen content of the first precipitate with $SO_2$ at pH 4.5, plainly indicate that the precipitate D-$P_1$ (#3, column D) with a $N_2$-content of 0.40% differs fundamentally from the corresponding precipitates A-$P_1$, B-$P_1$ and C-$P_1$ obtained from extractives A-S, B-S and C-S, respectively, while the closeness of these $N_2$-values under #4 for A, B, and C indicates that these precipitates contain nearly equal percentages of the same protein contaminated with nearly equal percentages of non-proteinous precipitate of the type D-$P_1$ of column D. Similarly, impure precipitates are undoubtedly obtained when soybean proteins are precipitated, by processes disclosed by the prior art, from alkali-extracts of soy flakes not previously extracted with m-Cel.

2. The figures in Table IV under #5 to #6b reveal that, due to the differences in chemical properties between the m-Cel-soluble soybean extractives (D-S) and the extractives (A-S, B-S and C-S), the precipitability of D-S is increased by considerable lowering the pH below 4.5 while the precipitability for A-S, B-S, and C-S had already reached its maximum at pH 4.5 (first precipitation). The figures under #8b indicate that the precipitable non-proteinous soybean fractions contained in D-S, D-$P_1$ and D-$P_2$ can exert their influence upon the $N_2$-content of precipitates such as A-$P_1$, B-$P_1$ and C-$P_1$ only by lowering the latters' nitrogen content by dilution as already concluded above from figures of #4, Table IV.

3. On the other hand, removal of the non-proteinous, m-Cel-soluble fractions of soybeans by m-Cel-extraction obviously not only raises the $N_2$-content of the soybeans, as shown by Table II above, but also increases the $N_2$-(or protein)-content of soybean "proteins" precipitated from alkali extracts of m-Cel-extracted soymeals.

The conclusions of the foregoing paragraph (3) are further supported by the experimental evidence shown in Table V which represent the results of four series (S-1, S-2, S-3 and S-4) of comparative protein-extraction and precipitation experiments using, as starting material commercial hexane-extracted soyflakes, not m-Cel-extracted as well as m-Cel-extracted. The methods of alkali-extraction and protein precipitation employed in the four series, have been intentionally varied to cover a great number of variations which commercial practice could possibly use, but it is expressly understood that painstaking care was taken to avoid any variations in the manipulations within each individual series to make the results as comparative as possible, and in no case was an attempt made to exhaustively extract all alkali-soluble matter from the raw materials (S) started out with. For comparative purposes, most of the data in Table V are calculated on the basis of 100 grams of moisture-free (dry) soybean raw material started out with.

TABLE V

*Typical comparative analyses of I. Soybean raw materials (S) for protein extraction; II. Acid-precipitated protein (P) from alkali-extracts of (S); and III. Soybean residues (R) from protein extraction of (S) by alkali showing the influence of m-Cel-extraction of (S) upon the composition of the respective (P) and (R)*

I. SOYBEAN—RAW MATERIALS (S) FOR PROTEIN EXTRACTION

| Table No. | | S-1 | S-1A | S-2 | S-2A | S-3 |
|---|---|---|---|---|---|---|
| | | White Flakes | M-Cel Extr. S-1 | White Flakes | M-Cel Extr. S-2 | Same as S-2 |
| | 100 grams contain: | | | | | |
| 1 | Dry matter | 93.6 g | 93.2 g | 92.6 g | 91.9 g | 92.6 g |
| 2 | $N_2$ | 7.87 g | 8.77 g | 7.98 g | 9.10 g | 7.98 g |
| 3 | 100 grams dry matter contain per cent $N_2$ or g $N_2$ | 8.41% | 9.72% | 8.61% | 9.90% | 8.61% |

| Table No. | | S-3A | S-4 | S-4A | S-4B | S-4C |
|---|---|---|---|---|---|---|
| | | Same as S-2A | White Flakes | M-Cel Extr. S-4 | Same as S-1A | Alcohol Extr. soyflakes |
| | 100 grams contain: | | | | | |
| 1 | Dry matter | 91.9 g | 93.7 G | 93.6 g | 93.2 g | 93.3 g |
| 2 | $N_2$ | 9.10 g | 8.12 g | 9.17 g | 8.77 g | 8.91 g |
| 3 | 100 grams dry matter contain per cent $N_2$ or g $N_2$ | 9.90% | 8.67% | 9.80% | 9.72% | 9.55% |

TABLE V—Continued

*Typical comparative analyses of I. Soybean raw materials (S) for protein extraction; II. Acid-precipitated protein (P) from alkali-extracts of (S); and III. Soybean residues (R) from protein extraction of (S) by alkali showing the influence of m-Cel-extraction of (S) upon the composition of the respective (P) and (R)*

II. ACID-PRECIPITATED PROTEIN (P) FROM ALKALI-EXTRACTS OF (S)

| Table No. | | S-1 | S-1A | S-2 | S-2A | S-3 |
|---|---|---|---|---|---|---|
| | | White Flakes | M-Cel Extr. S-1 | White Flakes | M-Cel Extr. S-2 | Same as S-2 |
| 4 | Extraction-Ratio: $\frac{1 \text{ (g air-dry S)}}{A \text{ (cc. NaOH Sol'n)}}$ | 1/20 | 1/20 | 1/15 | 1/15 | 1/15. |
| 4A | Extract containing B% NaOH | 0.1% | 0.1% | 0.15% pH 10 | 0.15% pH 10 | 0.15% pH 10. |
| 4B | 1st Extract.-period | 30 min | 30 min | 1 hr. (77° F.) | 1 hr. (77° F.) | 1 hr. (77° F.). |
| 4C | Total extract (from all extractions including wash-water) centrifuged: Cc. per dry matter [1] | 1350 cc | 1350 cc | 1487 cc (1 extraction a-1 wash 1:1) | 1395 cc → | 1403. (1 extraction). (1 wash 1:1½) |
| 4D | Cc. per 100 g dry S | 1442 cc (1 extraction No washing) | 1448 cc → | 1606 cc | 1518 cc | 1450 cc. |
| 4E | Solids content per 100 g dry S | | | 74.7 g (see table III, #6A–D) | 62.1 g | 63.8 g. |
| 4F | Other properties | Darker color, more turbid than S-1A | Lighter color, less turbid than S-1 | More intense colored than in S-2A. | Light brownish yellow. | Considerably darker more turbid than S-3A. |
| 5 | 1st Precipitation: | | | | | |
| 5A | Acid used | HCl | HCl | $SO_2$-gas | $SO_2$-gas | $SO_2$-gas. |
| 5B | At Temp | Room Temp. (75° F.) | Room Temp. (75° F.) | 39° C. (104° F.) | 39° C. (104° F.) | 39° C. (104° F.). |
| 5C | At pH | 4.8 | 4.8 | 4.5 | 4.5 | −4.5 (4.4+NaOH). |
| 5D | Yield of filtered whey [1] (see #6) | | | | | 1371 cc. |
| 5E | Solids content of whey [1] | | | | | 25.2 g. |
| 5F | Yield of filtered protein wet [1] | | | | | |
| 5G | Yield of protein air-dry [1] | | | 31.0 g | 29.0 g | 39.4 g. |
| 5H | Per cent $H_2O$ in #5G | 6.04% | 6.50% | 10.3% | 6.5% | 5.80%. |
| 5I | Dry matter in #5G | | | 27.8 g | 27.1 g | 37.1 g. |
| 5J | Per cent $N_2$ in #5i (-g $N_2$) | 15.37% | 16.44% | 13.96% (3.88 g.) | 15.23% (4.13 g.) | 14.71% (5.45 g.). |
| 5K | #5J in per cent of $N_2$ of #3 | | | 45.0% | 41.6% | 63.2%. |
| 5L | Other properties of protein | | | Dark brown, more gummy in air-dry state than S-2A. | Considerably lighter color than S-2; not brownish; more glassy-brittle. | Darker brown, more opaque than, not transparent glass-like as S-3A. |
| 6 | 2nd Precipitation: From #5D by raising pH to | | | | | |
| 6A | At temperature | | | | | |
| 6B | Yield of filtered protein; wet (pressed dry).[1] | | | | | |
| 6C | Air-dry [1] | | | | | |
| 6D | Per cent $H_2O$ in 6c | | | | | |
| 6E | Dry matter in #6C, g | | | | | |
| 6F | $N_2$ in #6C, grams, per cent | | | | | |
| 6G | #6F in per cent of $N_2$ of #3 | | | | | |
| 6H | Other properties of protein | | | | | |
| 7 | Total precipitates (air-dry): #5G+#6C | | | 31.0 g | 29.0 g | 39.4 g. |
| 7A | Total $N_2$ in #7 in per cent of $N_2$ of #3 (5K+6g) | | | 45.0% | 41.6% | 63.2%. |

| Table No. | | S-3A | S-4 | S-4A | S-4B | S-4C |
|---|---|---|---|---|---|---|
| | | Same as S-2A | White Flakes | M-Cel Extr. S-4 | Same as S-1A | Alcohol Extr. soyflakes |
| 4 | Extraction-Ratio: $\frac{1 \text{ (g air-dry S)}}{A \text{ (cc. NaOH Sol'n)}}$ | 1/15 | 1/15 | 1/15 | 1/15 | 1/15. |
| 4A | Extract containing B% NaOH | 0.15% pH 10 | 0.125% | 0.125% | 0.125% | 0.125%. |
| 4B | 1st Extract.-period | 1 hr. (77° F.) | 1 hr. (82° F.) | 1 hr. (82° F.) | 1 hr. (82° F.) | 1 hr. (82° F.). |
| 4C | Total extract (from all extractions including wash-water) centrifuged: Cc. per dry matter [1] | 1165 cc → | 1810 cc (2 extractions and 1 wash 1:2). | 1740 cc → | 1665 (2 extractions no wash). | 1785 cc. (2 extractions) (1 wash). |
| 4D | Cc. per 100 g. dry S | 1267 cc | 1931 cc | 1858 cc | 1786 cc | 1913 cc. |
| 4E | Solids content per 100 g. dry S | 48.0 g | 68.3 g | 58.9 g | 58.6 g | 65.5 g. |
| 4F | Other properties | Much lighter, not turbid as S-3. | Dark brownish, very turbid | Light greenish, opalescent. | Olive green | More turbid than S-4A, much more colored than S-4A, cleaner than S-4. |
| 5 | 1st Precipitation: | | | | | |
| 5A | Acid used | $SO_2$-gas | $SO_2$-gas | $SO_2$-gas | $SO_2$-gas | $SO_2$-gas. |
| 5B | At temp | 39° C. (104° F.) | 39° C. (104° F.) | 39° C. (104° F.) | 39° C. (104° F.) | 39° C. (104° F.). |
| 5C | At pH | 4.6 (4.4+NaOH) | −4.5 | −4.5 | −4.5 | 4.5. |
| 5D | Yield of filtered whey [1] (see #6) | 1371 cc | 1691 cc | 1682 cc | 1609 cc | 1564 cc. |
| 5E | Solids content of whey [1] | 21.2 g | 38.3 g | 26.4 g | 29.6 g | 34.1 g. |
| 5F | Yield of filtered protein wet [1] | | 274 g | 210 g | 236 g | 303 g. |
| 5G | Yield of protein air-dry [1] | 32.6 g | 34.7 g | 33.1 g | 32.1 g | 34.3 g. |
| 5H | Per cent $H_2O$ in #5G | 5.80% | 6.0% | 4.9% | 8.4% | 12.5%. |
| 5I | Dry matter in #5G | 30.7 g | 32.6 g | 31.5 g | 29.4 g | 30.0 g. |

[1] Per 100 g. of dry S.

TABLE V—Continued

*Typical comparative analyses of I. Soybean raw materials (S) for protein extraction; II. Acid-precipitated protein (P) from alkali-extracts of (S); and III. Soybean residues (R) from protein extraction of (S) by alkali showing the influence of m-Cel-extraction of (S) upon the composition of the respective (P) and (R)*

II. ACID-PRECIPITATED PROTEIN (P) FROM ALKALI-EXTRACTS OF (S)—Continued

| Table No. | | S-3A | S-4 | S-4A | S-4B | S-4C |
|---|---|---|---|---|---|---|
| | | Same as S-2A | White Flakes | M-Cel Extr. S-4 | Same as S-1A | Alcohol Extr. soyflakes |
| 5J | Per cent $N_2$ in #5i (-g $N_2$) | 15.38% (4.72 g.) | 13.87% (4.53 g.) | 15.38% (4.84 g.) | 14.97% (4.40 g.) | 14.08% (4.22 g.) |
| 5K | #5J in per cent of $N_2$ of #3 | 47.6% | 52.2% | 49.4% | 45.2% | 44.2% |
| 5L | Other properties of protein | Considerably lighter, pure yellow color than S-3, glass-like transparent. | Decidedly brownish-yellow color, opaque. | Very much lighter than S-4, color purer, more transparent than S-4 and S-4C. | About as S-4A | Decidedly olive-greenish, less yellow than S-4A, less brownish than S-4. |
| | 2nd Precipitation: | | | | | |
| 6 | From #5D by raising pH to | | 4.8-4.9 | 4.8 | 4.9 | 4.8. |
| 6A | At temperature | | 104° F | 104° F | 104° F | 104° F. |
| 6B | Yield of filtered protein; wet (pressed dry).[1] | | 36.2 g. creamy yellow. | 24.6 g., dead-white. | 28.9 g. | 75.7 g., dead-white. |
| 6C | -Air-dry [1] | | 11.2 g | 7.4 g | 10.1 g | 12.8 g. |
| 6D | Per cent $H_2O$ in 6c | | 9.6% | 8.4% | 11.5% | 6.9%. |
| 6E | Dry matter in #6C | | 10.1 g | 6.8 g | 8.9 g | 11.9 g. |
| 6F | $N_2$ in #6C, grams, per cent | | 1.65 g., 16.36% | 1.12 g., 16.50% | 1.43 g., 16.13% | 1.86 g., 15.63%. |
| 6G | #6F in per cent of $N_2$ of #3 | | 19.0% | 11.4% | 14.7% | 19.4%. |
| 6H | Other properties of protein | | Glassy mass, considerably darker than 1st precipitate. | Without pure yellow color of 1st precipitate. | | Lightest color of 2nd precipitate of S-4, -4A, -4C. |
| 7 | Total precipitates (air-dry): #5G+#6C | 32.6 g | 45.9 g | 40.5 g | 42.2 g | 47.1 g. |
| 7A | Total $N_2$ in #7 in per cent of $N_2$ of #3 (5K+6g). | 47.6% | 71.2% | 60.8% | 59.9% | 63.6%. |

III. SOYBEAN-RESIDUES (R) FROM PROTEIN-EXTRACTION OF (S) ACCORDING TO II

| Table No. | | S-1 | S-1A | S-2 | S-2A | S-3 |
|---|---|---|---|---|---|---|
| | | White Flakes | M-Cel Extr. S-1 | White Flakes | M-Cel Extr. S-2 | Same as S-2 |
| 8 | Soy-residue from #5D, pressed off per 100 g. of dry S. | | | | | |
| 8A | Water lost during drying of #8 of 120° F | | | | | |
| 8B | Residue #8, air-dry: $H_2O$-content: Per cent. | 6.62% | 6.91% | 24.8 g., 8.4% | 37.5 g., 5.4% | 45.3, 9.0%. |
| 8C | Residue #8 on dry basis | | | 20.8 g | 20.2 g | 41.2 g. |
| 8D | $N_2$ in #8C, in per cent | 5.30% | 6.45% | 3.15% | 6.16% | 5.12%. |
| 8E | #8D in per cent of $N_2$ of #3 | | | 7.7% | 12.5% | 24.5%. |
| 9 | Total $N_2$ recovered in #7A+#8E in per cent of #3. | | | 52.7% | 54.1% | 87.7%. |

| Table No. | | S-3A | S-4 | S-4A | S-4B | S-4C |
|---|---|---|---|---|---|---|
| | | Same as S-2A | White Flakes | M-Cel Extr. S-4 | Same as S-1A | Alcohol Extr. soyflakes |
| 8 | Soy-residue from #5D, pressed off per 100 g. of dry S. | | 205 g | 269 g | 276 g | 294 g. |
| 8A | Water lost during drying of #8 of 120° F | | 164.4 g | 218.8 g | 231.0 g | 251.2 g. |
| 8B | Residue #8, air-dry: $H_2O$-content: Per cent. | 56.0 g., 7.2% | 40.5 g., 9.7% | 50.2 g., 9.9% | 45.0 g., 6.9% | 42.8 g., 6.2%. |
| 8C | Residue #8 on dry basis | 42.9 g | 36.6 g | 45.2 | 41.9 g | 40.2 g. |
| 8D | $N_2$ in #8C, in per cent | 6.78% | 4.82% | 6.58% | 6.82% | 7.41%. |
| 8E | #8D in per cent of $N_2$ of #3 | 29.3% | 20.3% | 30.4% | 31.5% | 31.1%. |
| 9 | Total $N_2$ recovered in #7A+#8E in per cent of #3. | 76.9% | 91.5% | 91.2% | 91.4% | 94.7%. |

[1] Per 100 g. of dry S.

Referring to Part I of Table V, S-1, S-2, S-3 and S-4 are the hexane extracted soyflakes from which, by extraction with methyl-"Cellosolve," the respective m-Cel extracted soyflakes S-1*a*, S-2*a*, S-3*a* and S-4*a* have been prepared (S-4*b* is the same as S-1*a*, while S-4*c* is an alcohol extracted soyflake). Horizontal lines 1 to 3 give essential analytical data concerning these raw materials for soy protein production.

Part II of Table V discloses in horizontal lines 4*a* to 4*f* the comparative preparation of alkali extracts of the above raw materials by methods differing by: extraction ratios (line 4); NaOH-concentration of extracts (line 4*a*); and extraction periods (line 4*b*); while lines 4*c* to 4*f* show in each case the resulting influences which the above variations in extraction procedure exert upon the amounts of extracts obtainable (lines 4*c*-4*d*), and the latters' solid-content (line 4*e*), and colors (column 4*f*).

These alkali extracts were generally prepared by immersing, for example, with an extraction ratio of 1/20 (one unit of weight of the soy material in 20 units of volume of alkali solution), gently agitating for a specified time, removing the coarse solids by screening and the fines by centrifuging.

In Part II of Table V, horizontal lines 5*a* to 5*l* illustrate the influence which differences of soybean raw materials used for protein production exert upon the properties of proteins precipitated from the above alkali extracts by carefully acidifying the latter with acids (line 5a) at certain temperatures (line 5b) to a certain pH (line 5c). The precipitated protein is removed by centrifuging. Part III, of Table V shows the soybean residues (R) which result from protein-extraction of soyflakes, according to the methods indicated in Part II of Table V.

The most important results are those under #5j which show that no matter what kind of extraction method and precipitation procedure (with pH varying between 4.5 and 4.8) was employed, the nitrogen content of the precipitated proteins obtained from the m-Cel-extracted soy-raw materials appeared to be consistently and substantially higher than that of proteins obtained from non-m-Cel-extracted soyflakes. The $N_2$-increases (1.07%; 1.27%; 0.67%; 1.51%; 1.10%) averaged 1.12%, including the result of S–3 vs. S–3a-series which because of certain experimental difficulties during protein-precipitation (see #5c), with a difference of only 0.67% fell out of line. The 0.21% result of S–4 vs. S–4c, with a sample of ethyl alcohol-extracted soyflakes, demonstrates, in comparison with S–4a and S–4b, that alcohol-extraction of soyflakes does not accomplish what m-Cel-extraction does. It should be borne in mind that the above 1.12% average-nitrogen increase is the equivalent of 6.74% ($N \times 6.02$) to 7.00% ($N \times 6.25$) of protein, discussed hereinbefore.

As the data of Table V, #5g (yield of air-dry protein), #5i (yield of dry protein) and #7 (total air-dry precipitates) indicate, no increase in the yield of proteins precipitated under the experimental conditions of the tests was observed with m-Cel-extracted soyflakes, said protein yield apparently being greatly dependent upon the thoroughness with which the soy-raw materials were extracted by alkali. The figures of Table V, #8c (soy-residues from extractions on dry basis) and 8e (nitrogen in #8c in percent of $N_2$ of #3) illustrate very plainly that in all cases m-Cel-extracted soy-raw materials have been less exhaustively extracted under equal conditions than non-m-Cel-extracted soy-material with the result that nitrogen contents of dry extracted soy-residues (#8d) from m-Cel-extracted raw materials are very considerably higher (S–4 vs. S–4a: 1.76%, S–4 vs. S–4b: 2.00%, S–3 vs. S–3a: 1.66%; S–2 vs. S–2a: 2.91%: S–1 vs. S–1a: 1.15%) than those of the corresponding soy-materials not extracted with m-Cel.

Alkali-extraction of the m-Cel-extracted raw materials, until the $N_2$-contents of the residues (#8d, Table V) and the degree of $N_2$-extraction from the raw materials (#83, Table V) reach the values obtained in corresponding extractions of non-m-Cel-extracted soy materials, increase the yield of higher quality soy proteins from m-Cel-extracted soyflakes above that normally obtained with ordinary extracted soyflakes.

The correctness of this highly important conclusion appears strikingly illustrated by the results of a comparative extraction and precipitation test of soybean raw materials S–1 and S–1a of Table V, made by dispersing 300 g. of air-dry flakes in 3000 cc. of water of 27° C. (30.6° F.), raising the pH to 10 with NaOH, filtering through cheese cloth after one hour's stirring, washing of residue with 100 cc. water, centrifuging in 250 cc. centrifuge tubes, acidifying the (2600 g.) filtrate with $SO_2$-gas to pH 4.5, after having raised the temperature to 39° C. (104° F.), allowing to stand all night, filtering and air-drying the filtered off material, yields of 66.5 g. for S–1 and 84.5 g. for S–1a, respectively, were obtained. Thus, the yields of air-dry precipitates, per 100 g. of air-dry flakes started out with, amounted to 22.16 g. and 28.16 g., respectively and the yield from S–1a surpassed that from S–1 by 6.0% by weight of air-dry raw material or 27.0% by weight of the precipitate from S–1.

Further proof that alkali extracts from m-Cel-extracted soy materials are purer than those from ordinary white flakes is given by the figures of Table V (#5e) which show that the solids-content of the whey from which the first precipitate has been removed is noticeably lower whenever m-Cel-extracted soyflakes were used as raw material. At the same time, figures of Table V (#6e and #6g) indicate that the amount of substances contained in the said whey from the first precipitation, and precipitable at a pH of 4.8–4.9, is noticeably smaller whenever m-Cel-extracted flakes are used as raw material (S–4a, S–4b). In other words, in the latter cases noticeably smaller losses (compare Table V, #6g: S–4a and S–4b vs. S–4) of proteinous precipitable matter, not precipitated at pH 4.5, would be encountered under the conditions of the above experiments—and the $N_2$-contents (Table V, #6f), of all of the 2nd precipitates of S–4, –4a and –4c indicate that the latter are representing practically pure proteins when the most widely used conversion factors 6.02 to 6.25 are used. The increased yields of precipitable nitrogenous compounds obtained by following up a first precipitation at pH 4.5 by a second precipitation at pH 4.8–4.9 suggest a similar procedure as a commercial means of further increasing the purity and yield of soy proteins.

The beneficial effect of the removal of the m-Cel-soluble fractions from soybean-material follows from the colloidal nature of the said m-Cel-soluble fractions which adversely affect the particle size of the precipitates, and the rate of sedimentation and filtrability of such precipitates from dispersions, and which are believed to be largely responsible for the difficulties heretofore encountered and overcome by the methods disclosed herein.

The non-proteinous nature of the m-Cel-soluble soybean-fractions, makes it obvious that "soy-protein" originating in m-Cel-extracted soybean-raw material is superior to protein from ordinary soybean-material with regard to its suitability as a component of plastics and other products where protein-purity is the key to quality.

The essential steps of the above described novel process for producing proteins of higher purity may be summarized as follows.

Hexane extracted soyflakes, commercially, known as "white flakes" are extracted with methyl "Cellosolve" according to the methods described in my copending application, Serial No. 730,539, filed February 24, 1947 (Case A); the methyl "Cellosolve" is removed from the flakes by the usual methods, preferably including a vacuum treatment to avoid raising the temperature of the flakes; these extracted flakes are then further extracted in an aqueous solution of pH varying between 7 and 11 (preferable pH of approximately 10); the residual flakes are then removed by centrifuging or screening, and the solution is acidified with any preferred acid, such as hydrochloric or sulphuric acid, or with gaseous $SO_2$, at a pH, near the iso-electric point of the soya-bean protein, or approximately 4.5; the precipitated protein is removed from the whey the pH of which is then raised to 4.8–4.9 producing a second precipitation of protein; the precipitated proteins are separated from the liquids by centrifuging or other mechanical means and dried. The characteristics of the resulting proteins can, of course, be changed by variations in the time and temperature of the alkaline treatment and temperature of precipitation, as indicated in Table V above.

The invention disclosed herein has been described for illustrative purposes in its preferred embodiment, but it is to be understood that the scope of the invention is defined by the appended claims rather than by the foregoing description.

What I claim is:

1. A process of producing high purity proteins which process comprises extracting oil-free soybean flakes with an alkoxy ethanol, removing the extract from the residue, extracting the residual flakes in an aqueous solution of pH varying between 7 and 11 and removing the residue, acidifying the resulting extract, removing the resulting precipitated protein from the whey, and drying said protein.

2. A process of producing high purity protein which process comprises extracting hexane-extracted soybean flakes with methoxy ethanol, removing the extract from the residue, extracting the residual flakes in aqueous solution of pH varying from 7 to 11 and removing the residue, acidifying the resulting extract with gaseous sulphur dioxide to a pH of approximately 4.5, removing the resulting precipitated protein from the whey, raising the pH of said whey to 4.8 to 4.9 thus producing a second precipitation of protein, separating said precipitate from its whey, and combining and drying the precipitated proteins.

3. A process of producing high purity proteins which process comprises extracting hexane-extracted soybean flakes with an alkoxy ethanol, removing the extract from the residue by draining and vacuum treatment without raising the temperature of said flakes, extracting the residual flakes in an aqueous solution of pH varying between 7 and 11 and removing the residue, acidifying the resulting extract, removing the resulting precipitated protein from the whey, and drying said protein.

4. A process of producing high purity proteins which process comprises extracting hexane-extracted soybean flakes with an alkoxy ethanol, removing the extract from the residue, extracting the residual flakes in an aqueous solution of pH varying between 7 and 11, and removing the residue, acidifying the resulting extract, removing the resulting precipitated protein from the whey, and drying said protein.

5. A process of producing high purity proteins which process comprises extracting hexane-extracted soybean flakes with an alkoxy ethanol, removing the extract from the residue, extracting the residual flakes in an aqueous solution of pH approximately 10, and removing the residue, acidifying the resulting extract, removing the resulting precipitated protein from the whey, and drying said protein.

6. A process of producing high purity proteins which process comprises extracting oil-free soybean flakes with an alkoxy ethanol, removing the extract from the residue, extracting the residual flakes in an aqueous solution of pH approximately 10 and removing the residue, acidifying the resulting extract to a pH of approximately 4.5, removing the resulting precipitated protein from the whey, and drying said protein.

7. A process of producing high purity proteins which process comprises extracting oil-free soybean flakes with an alkoxy ethanol, removing the extract from the residue, extracting the residual flakes in an aqueous solution of pH approximately 10 and removing the residue, acidifying the resulting extract with hydrochloric acid, removing the resulting precipitated protein from the whey, and drying said protein.

8. A process of producing high purity proteins which process comprises extracting hexane-extracted soybean flakes with an alkoxy ethanol, removing the extract from the residue, extracting the residual flakes in an aqueous solution of pH approximately 10 and removing the residue, acidifying the resulting extract with sulphuric acid, removing the resulting precipitated protein from the whey, and drying said protein.

9. A process of producing high purity proteins which process comprises extracting hexane-extracted soybean flakes with an alkoxy-ethanol, removing the extract from the residue, extracting the residual flakes in an aqueous solution of pH approximately 10 and removing the residue, acidifying the resulting extract with gaseous sulphur dioxide, removing the resulting precipitated protein from the whey, and drying said protein.

10. A process of producing high purity protein which process comprises extracting hexane-extracted soybean flakes with methoxy ethanol, removing the extract from the residue, extracting the residual flakes in aqueous solution of pH approximately 10 and removing the residue, acidifying the resulting extract to a pH of approximately 4.5, removing the resulting precipitated protein from the whey, raising the pH of said whey to 4.8 to 4.9 thus producing a second precipitation of protein, separating said second precipitate from its whey, and combining and drying the precipitated proteins.

11. A process of producing high purity proteins which process comprises extracting hexane-extracted soybean flakes with methoxy ethanol, removing the extract from the residue by vacuum treatment without raising the temperature of said flakes, extracting the residual flakes in an aqueous solution of pH approximately 10 and removing the residue, acidifying the resulting extract to a pH of approximately 4.5, removing the resulting precipitated protein from the whey, raising the pH of said whey to 4.8 to 4.9 thus producing a second precipitation of protein, separating said second precipitate from its whey, and combining and drying the precipitated proteins.

12. A process of producing high purity protein which process comprises extracting hexane-extracted soybean flakes with methoxy ethanol, removing the extract from the residue, extracting the residual flakes in aqueous solution of pH varying between 7 and 11, and removing the residue, acidifying the resulting extract to a pH of approximately 4.5, removing the resulting precipitated protein from the whey, raising the pH of said whey to 4.8 to 4.9 thus producing a second precipitation of protein, separating said second precipitate from its whey, and combining and drying the precipitated proteins.

13. A process of producing high purity protein which process comprises extracting hexane-extracted soybean flakes with methoxy ethanol, removing the extract from the residue, extracting the residual flakes in aqueous solution of pH approximately 10, and removing the residue, acidifying the resulting extract to a pH of approximately 4.5, removing the resulting precipitated protein from the whey, raising the pH of said whey to 4.8 to 4.9 thus producing a second precipitation of protein, separating said second precipitate from its whey, and combining and drying the precipitated proteins.

14. A process of producing high purity protein which process comprises extracting hexane-extracted soybean flakes with methoxy ethanol, removing the extract from the residue, extracting the residual flakes in aqueous solution of pH varying from 7 to 11 and removing the residue, acidifying the resulting extract with hydrochloric acid to a pH of approximately 4.5, removing the resulting precipitated protein from the whey, raising the pH of said whey to 4.8 to 4.9 thus producing a second precipitation of protein, separating said second precipitate from its whey, and combining and drying the precipitated proteins.

15. A process of producing high purity protein which process comprises extracting hexane-extracted soybean flakes with methoxy ethanol, removing the extract from the residue, extracting the residual flakes in aqueous solution of pH varying from 7 to 11 and removing the residue, acidifying the resulting extract with sulphuric acid to a pH of approximately 4.5, removing the resulting precipitated protein from the whey, raising the pH of said whey to 4.8 to 4.9 thus producing a second precipitation of protein, separating said second precipitate from its whey, and combining and drying the precipitated proteins.

HERBERT OTTO RENNER.

REFERENCES CITED

The following references are of record in the file of this patent:

UNITED STATES PATENTS

| Number | Name | Date |
|---|---|---|
| 1,260,656 | Bollman | Mar. 26, 1918 |
| 2,191,455 | Davis | Feb. 27, 1940 |
| 2,200,391 | Freeman | May 14, 1940 |
| 2,233,213 | Kniseley et al. | Feb. 25, 1941 |
| 2,278,670 | Rauer | Apr. 7, 1942 |
| 2,354,393 | Manley et al. | July 25, 1944 |
| 2,405,830 | Irving et al. | Aug. 13, 1946 |